United States Patent
Shaffer et al.

(10) Patent No.: US 9,723,179 B2
(45) Date of Patent: Aug. 1, 2017

(54) TIME DELAY AND INTEGRATION (TDI) IMAGING SENSOR AND METHOD

(71) Applicant: RAYTHEON COMPANY, Waltham, MA (US)

(72) Inventors: Stephen P. Shaffer, West Hills, CA (US); Stephen M. Palik, Playa Vista, CA (US); Hector A. Quevedo, Redondo Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 166 days.

(21) Appl. No.: 14/553,038

(22) Filed: Nov. 25, 2014

(65) Prior Publication Data

US 2016/0150128 A1    May 26, 2016

(51) Int. Cl.
| | |
|---|---|
| *H04N 5/335* | (2011.01) |
| *H04N 3/14* | (2006.01) |
| *H04N 5/372* | (2011.01) |
| *H04N 5/3725* | (2011.01) |
| *H04N 5/349* | (2011.01) |
| *H04N 5/374* | (2011.01) |

(52) U.S. Cl.
CPC .......... *H04N 3/1543* (2013.01); *H04N 5/349* (2013.01); *H04N 5/3725* (2013.01); *H04N 5/3743* (2013.01); *H04N 5/37206* (2013.01); *H04N 5/37213* (2013.01)

(58) Field of Classification Search
CPC .. H04N 3/1543; H04N 3/1525; H04N 3/1581; H04N 5/372
USPC .................................................. 348/294, 295
See application file for complete search history.

(56) References Cited

U.S. PATENT DOCUMENTS

| | | | |
|---|---|---|---|
| 8,368,774 B2 | 2/2013 | Grycewicz | |
| 8,558,899 B2 | 10/2013 | Grycewicz | |
| 2009/0256735 A1* | 10/2009 | Bogaerts | H03M 1/1019 341/169 |
| 2011/0298956 A1 | 12/2011 | Giffard et al. | |

(Continued)

FOREIGN PATENT DOCUMENTS

| | | |
|---|---|---|
| EP | 0265010 A1 | 4/1988 |
| JP | 2009033286 A * | 2/2009 |

OTHER PUBLICATIONS

Blommel et al., "The Effects of Microscan Operation on Staring Infrared Sensor Imagery", Proc. SPIE. 1540, Infrared Technology XVII, pp. 653-664 (Dec. 1, 1991).

*Primary Examiner* — Usman Khan
(74) *Attorney, Agent, or Firm* — Lando & Anastasi, LLP

(57) ABSTRACT

According to one aspect, embodiments herein provide a TDI image sensor comprising an array of light sensing elements, at least one clock, and an image processor, wherein the at least one clock is configured to operate a first plurality of the light sensing elements to transfer accumulated charge to an adjacent element at a first phase and to operate a second plurality of the light sensing elements to transfer accumulated charge to an adjacent element at a second phase, and wherein the image processor is configured to read out a first signal from the first plurality of light sensing elements corresponding to a total charge accumulated at the first phase, to read out a second signal from the second plurality of light sensing elements corresponding to a total charge accumulated at the second phase, and to combine the first signal and the second signal to generate an image.

14 Claims, 3 Drawing Sheets

(56) References Cited

U.S. PATENT DOCUMENTS

2012/0230602 A9 9/2012 Goodnough et al.
2013/0176552 A1* 7/2013 Brown .............. H01L 27/14806
356/51

* cited by examiner

TIME DELAY AND INTEGRATION (TDI) IMAGING SENSOR AND METHOD

BACKGROUND

Time Delay and Integration (TDI) image sensors are commonly used to capture images of moving objects at low light levels in a field of view. TDI image sensors include multiple rows of light sensing elements. Each element accumulates an electric charge proportional to the light intensity at that location in the field of view, and shifts its partial measurement of light incident on the image sensor to an adjacent light sensing element synchronously with the motion of the moving object across the array of light sensing elements.

For example, a first element in a row of elements may receive a charge generated by a first photon generated, or reflected, by a particular point on an object being scanned. The received charge generated by the first photon may be passed from the first element to a second element of the row as the second element also receives a charge generated by a second photon generated, or reflected, by the same point on the object being scanned. Thus, as each element of the row receives a charge generated by a photon generated, or reflected, by the same point on the object being scanned and passes its charge to an adjacent element, the charges generated by the elements in the row accumulate, thereby increasing the low-light imaging capability of the sensor. The total accumulated charge is read out at the end of each row and utilized to generate a digital image.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

SUMMARY OF INVENTION

Figure 1:
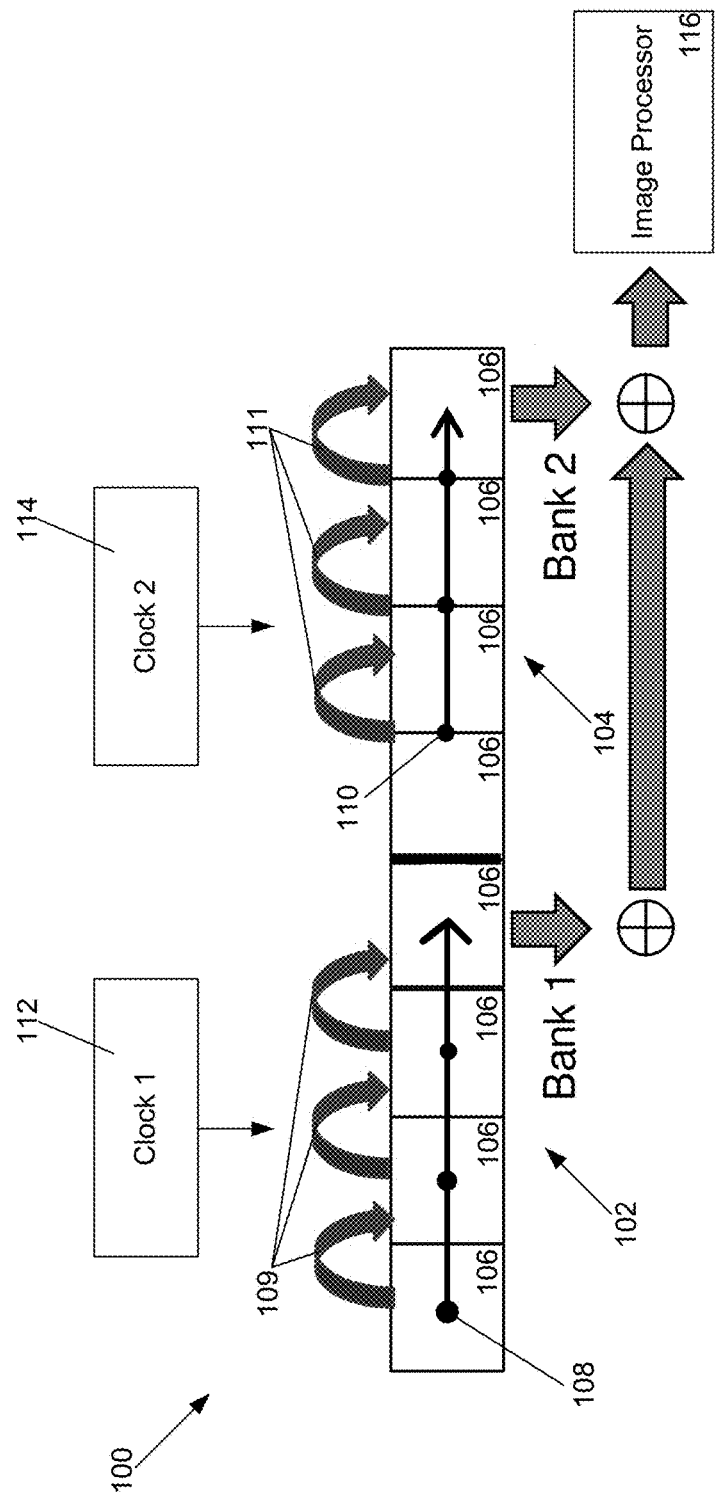
FIG. 1 is a block diagram illustrating one embodiment of a TDI image sensor according to aspects of the invention.

Aspects and embodiments are directed to a system and method for improving the sampling resolution of a TDI image sensor by electronically introducing a phase shift between sets of image data. By electronically introducing a phase shift between sets of image data, the resolution of a large Field of View (FOV) TDI image sensor may be improved without requiring the potentially complex moving parts of a traditional TDI image sensor.

In one embodiment, an array of light sensing elements in a TDI image sensor is electronically divided into multiple banks of light sensing elements. Each bank is controlled at a different phase, and image data read out at the end of each bank is combined to derive an image with improved resolution. In another embodiment, during a first frame, the entire array of light sensing elements is read out at a first phase and during a second frame, the entire array of light sensing elements is ready out at a second phase. The image data from the first frame and the second frame is combined to derive an image with improved resolution. In another embodiment, an array of light sensing elements is operated simultaneously at two different phases in two parallel paths and the image data from each parallel path is combined to derive an image with improved resolution.

At least one aspect described herein is directed to a Time Delay and Integration (TDI) image sensor comprising an array of light sensing elements arranged in a row, each light sensing element configured to accumulate charge proportional to an intensity of light incident on the light sensing element from a field of view, at least one clock coupled to the array of light sensing elements, and an image processor coupled to the array of light sensing elements, wherein the at least one clock is configured to operate a first plurality of the light sensing elements to transfer the accumulated charge to an adjacent light sensing element at a first phase and to operate a second plurality of the light sensing elements to transfer the accumulated charge to an adjacent light sensing element at a second phase, and wherein the image processor is configured to read out a first signal from the first plurality of light sensing elements corresponding to a total charge accumulated in the first plurality of light sensing elements at the first phase, to read out a second signal from the second plurality of light sensing elements corresponding to a total charge accumulated in the second plurality of light sensing elements at the second phase, and to combine the first signal and the second signal to generate an image.

According to one embodiment, the first plurality of light sensing elements is the same as the second plurality of light sensing elements. In one embodiment, the image processor is further configured to read out the first signal and the second signal from a light sensing element at an end of the row of light sensing elements. In another embodiment, the image processor is further configured to read out the first signal from the light sensing element at the end of the row during a first frame and to read out the second signal from the light sensing element at the end of the row during a second frame.

According to another embodiment, the TDI image sensor further comprises a first memory bank coupled to the light sensing element at the end of the row of light sensing elements and configured to store the first signal, and a second memory bank coupled to the light sensing element at the end of the row of light sensing elements and configured to store the second signal, wherein the image processor is further configured to read out the first signal and the second signal in parallel from the first memory bank and the second memory bank. In one embodiment, the array of light sensing elements includes at least one digital pixel.

According to one embodiment, the at least one clock includes a first clock operating at the first phase and a second clock operating at the second phase. In another embodiment, the first plurality of light sensing elements is arranged in a first row and operated by the first clock to transfer the accumulated charge to an adjacent light sensing element at the first phase, and the second plurality of light sensing elements is arranged in a second row and operated by the second clock to transfer the accumulated charge to an adjacent light sensing element at the second phase. In one embodiment, the image processor is configured to read out the first signal from a light sensing element at an end of the first row and to read out the second signal from a light sensing element at an end of the second row.

According to another embodiment, the first phase of the at least one clock corresponds to a central location in the field of view of each light sensing element. In one embodiment, the second phase of the at least one clock corresponds to an edge location of the field of view of each light sensing element.

Another aspect described herein is directed to a method for operating a TDI image sensor comprising an array of light sensing elements arranged in a row, the method comprising acts of accumulating, in each light sensing element, charge proportional to an intensity of light incident on the light sensing element from a field of view, transferring, by a first plurality of the light sensing elements, the accumulated charge to an adjacent light sensing element at a first phase, transferring, by a second plurality of the light sensing elements, the accumulated charge to an adjacent light sensing element at a second phase, generating, by the first plurality of light sensing elements, a first signal corresponding to a total charge accumulated in the first plurality of light sensing elements at the first phase, generating, by the second plurality of light sensing elements, a second signal corresponding to a total charge accumulated in the second plurality of light sensing elements at the second phase, and combining the first signal with the second signal to generate an image.

According to one embodiment, generating the first signal includes generating the first signal at a light sensing element at an end of the row of light sensing elements, and generating the second signal includes generating the second signal at the light sensing element at the end of the row of light sensing elements. In another embodiment, generating the first signal includes generating the first signal at the light sensing element at the end of the row of light sensing elements during a first frame, and generating the second signal includes generating the second signal at the light sensing element at the end of the row of light sensing elements during a second frame. In one embodiment, the acts of generating the first signal and generating the second signal are performed in parallel.

According to another embodiment, the method further comprises separating the array of light sensing elements into a first row corresponding to the first plurality of light sensing elements and a second row corresponding to the second plurality of light sensing element. In one embodiment, generating the first signal includes generating, at a light sensing element at an end of the first row, the first signal corresponding to the total charge accumulated in the first plurality of light sensing elements at the first phase, and generating the second signal includes generating, at a light sensing element at an end of the second row, the second signal corresponding to the total charge accumulated in the second plurality of light sensing elements at the second phase.

According to one embodiment, transferring, by the first plurality of light sensing elements, the accumulated charge to an adjacent light sensing element at the first phase includes transferring, by each light sensing element in the first plurality of light sensing elements, accumulated charge corresponding to a central location in the field of view of each light sensing element. In another embodiment, transferring, by the second plurality of light sensing elements, the accumulated charge to an adjacent light sensing element at the second phase includes transferring, by each light sensing element in the second plurality of light sensing elements, accumulated charge corresponding to an edge location in the field of view of each light sensing element.

One aspect described herein is directed to a Time Delay and Integration (TDI) image sensor comprising a plurality of light sensing elements, each configured to accumulate charge proportional to an intensity of light incident on the light sensing element from a field of view, and means for improving the sampling resolution of the TDI image sensor by electronically introducing phase shift between at least two sets of image data generated by the plurality of light sensing elements and for generating an image of the field of view based on the at least two sets of phase shifted image data.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Any embodiment disclosed herein may be combined with any other embodiment in any manner consistent with at least one of the objectives, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment.

DETAILED DESCRIPTION

There are many different types of image capturing devices such as digital cameras, video cameras, or other photographic and/or image capturing equipment. These image capturing devices may use image sensors, such as Charge-Coupled Devices (CCD), Active Pixel Sensors (APS), or other suitable light sensing elements, to capture images of a scene. For example, an image sensor may be composed of a unit cell array that receives light via a lens. The light causes each unit cell to accumulate an electric charge proportional to the light intensity at that location. Each unit cell in the array typically includes circuitry such as a photo-diode, a capacitor and other components.

Each unit cell in an array generally corresponds to a picture element, or pixel, in the final image of the scene. A pixel is considered the smallest portion of a digital image. A digital image is generally made up of an array of pixels. Circuitry coupled to the image capturing device may perform post light capture processing steps to convert the accumulated charges from each unit cell into pixel information. This information may include the color, saturation, brightness, or other information that a digital image storage format may require. Digital images may be stored in formats such as .JPG, .GIF, .TIFF, or any other suitable format.

As discussed above, TDI image sensors are commonly used to capture images of moving objects at low light levels in a field of view. However, in large Field Of View (FOV) systems (e.g., such as Infrared Search and Track (IRST) systems), images generated by a TDI image sensor must typically be undersampled to adequately cover the large FOV with the limited number of light sensing elements in the TDI image sensor. This undersampling may limit the resolution of the TDI image sensor and result in undesired quantization distortion in the resulting digital image.

Traditional methods for improving resolution and preventing undesired quantization distortion in a large FOV TDI image sensor include physically shifting the sampling lattice of the image sensor between frames and combining the results in post processing.

Such phase shifting may be accomplished by utilizing microdithering.

Microdithering involves physically moving the image sensor, or the light sensing elements of the image sensor, in sub-pixel steps between frames to intentionally introduce noise to randomize quantization error and prevent large-scale patterns such as color banding in a resulting image. Other methods for physically introducing phase shift between frames of an image sensor include combining multiple images taken with natural motion (i.e., drizzle) between frames, combining images taken with multiple banks of physically separated TDI images sensors with sub-pixel offsets, or rotating (i.e., angling) the focal plane of the image sensor with respect to the scanned FOV. Such methods requiring the physical movement and/or separation of portions of the TDI image sensor to introduce phase shift between frames also typically require complex control, digital image reconstruction, and/or motorization systems.

Accordingly, a system and method for improving the sampling resolution of a TDI image sensor by electronically introducing phase shift between sets of image data is provided. In one embodiment, an array of light sensing elements in the TDI image sensor is electronically divided into multiple banks of light sensing elements. Each bank is controlled at a different phase and image data read out at the end of each bank is combined to derive an image with improved resolution. In another embodiment, during a first frame, the entire array of light sensing elements is read out at a first phase and during a second frame, the entire array of light sensing elements is ready out a second phase. The image data from the first frame and the second frame is combined to derive an image with improved resolution. In another embodiment, an array of light sensing elements are operated at two different phases in two parallel paths and the image data from each parallel path is combined to derive an image with improved resolution. The TDI image sensor electronically introduces phase shift between frames, and improves resolution, without requiring the potentially complex moving parts of the traditional TDI image sensors discussed above.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 is a block diagram illustrating one embodiment of a TDI image sensor 100 that may be used to capture images of a desired field of view. The sensor 100 includes an array of light sensing elements 106. The array of light sensing elements is electronically subdivided into two banks, namely a first bank 102 and a second bank 104. The first bank of light sensing elements 102 is controlled by a first clock 112 and the second bank of light sensing elements 104 is controlled by a second clock 114. Each bank of light sensing elements 102, 104 is also coupled to an image processor 116.

As light is incident on the sensor 100 from an object moving across the light sensing elements 106, each light sensing element 106 accumulates an electric charge proportional to the intensity of light incident on the light sensing element. The field of view is scanned across the focal plane of the sensor 100 (i.e., across each light sensing element 106), to generate an image. For example, as shown by the arrows 109 in FIG. 1, the charge accumulated by each light sensing element 106 in the first bank 102, as the object moves across the light sensing elements 106 in the first bank 102, is shifted to an adjacent light sensing element 106 (e.g., from left to right) until a signal corresponding to the total charge accumulated by the first bank of light sensing elements 102 is read out at the end (e.g., at the right side) of the bank 102 by the image processor 116.

Similarly, as shown by the arrows 111 in FIG. 1, the charge accumulated by each light sensing element 106 in the second bank 104, as the object moves across the light sensing elements 106 of the second bank 104, is shifted to an adjacent light sensing element 106 (e.g., from left to right) until a signal corresponding to the total charge accumulated by the second bank of light sensing elements 104 is read out at the end (e.g., at the right side) of the bank 104 by the image processor 116.

The transfer of accumulated charge by each light sensing element 106 in the first bank 102 is controlled by the first clock 112 operating at a first phase. As the object moves across a light sensing element 106 in the first bank 102 and the light sensing element 106 accumulates charge proportional to the intensity of light incident on the light sensing element 106 from the object, the first clock 112 controls the light sensing element 106 to transfer accumulated charge at the first phase. For example, in one embodiment, the first clock 112, operating at the first phase, controls the light sensing element 106 to transfer accumulated charge when the object is at a central point 108 in the field of view of the light sensing element 106. However, in other embodiments, the first phase of the first clock 112 may be configured differently to control each light sensing element 106 in the first bank 102 to transfer accumulated charge when the object is at any other desired point in the field of view of the light sensing element 106.

The transfer of accumulated charge by each light sensing element 106 in the second bank 104 is controlled by the second clock 114 operating at a second phase. As the object moves across a light sensing element 106 in the second bank 104 and the light sensing element 106 accumulates charge proportional to the intensity of light incident on the light sensing element 106 from the object, the second clock 114 controls the light sensing element 106 to transfer accumulated charge at the second phase. For example, in one embodiment, the second clock 114, operating at the second phase, controls the light sensing element 106 to transfer accumulated charge when the object is at an edge location 110 in the field of view of the light sensing element 106. However, in other embodiments, the second phase of the second clock 114 may be configured differently to control each light sensing element 106 in the second bank 104 to transfer accumulated charge when the object is at any other desired point in the field of view of the light sensing element 106.

Utilizing knowledge of the first phase and the second phase, the image processor 116 combines the image data from each bank 102, 104 to generate a digital image of the field of view. By electronically separating the light sensing elements 106 into two banks 102, 104 and introducing phase shift between the image data generated by the two banks 102, 104, the resolution of the resulting digital image may be improved without requiring the physical movement and/or the physical separation of portions of the sensor 100.

As described above, the array of light sensing elements is electronically divided into two banks, each operated at a different phase; however, in other embodiments, the array of light sensing elements may be electronically divided into more than two banks, each operated at a different phase by a different clock. As also described above, in certain embodiments, the first phase and the second phase are separated by an offset of 90 degrees; however, in other embodiments, the offset between the first phase and the second phase may be configured differently.

Figure 2:
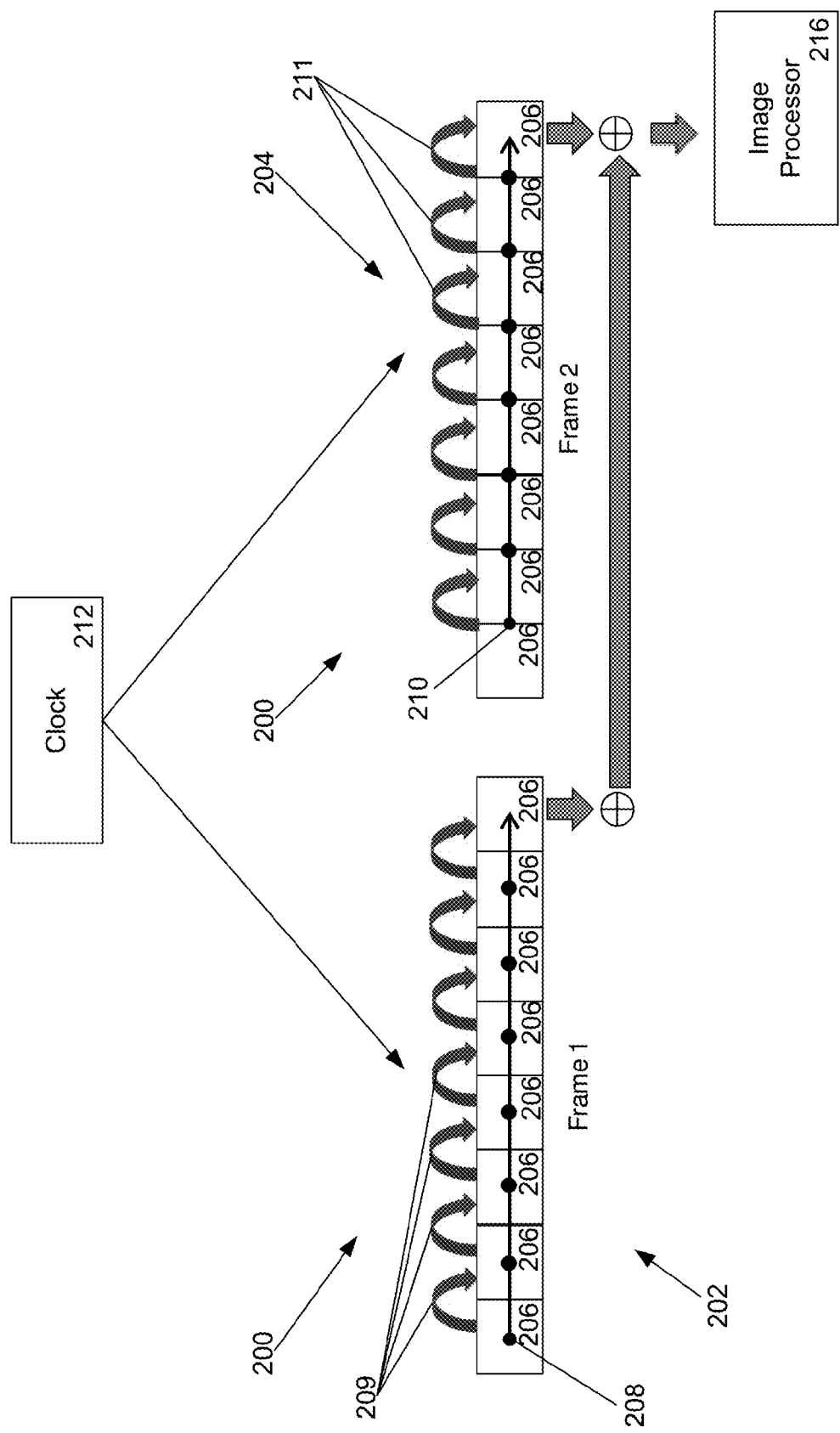
FIG. 2 is a block diagram illustrating another embodiment of a TDI image sensor according to aspects of the invention.

FIG. 2 is a block diagram illustrating another embodiment of a TDI image sensor 200 that may be used to capture images of a desired field of view. The sensor 200 includes an array of light sensing elements 206. The array of light sensing elements 206 is controlled by a clock 212 and coupled to an image processor 216. FIG. 2 illustrates the image sensor 200 operating over a first frame 202 and a second frame 204.

As light is incident on the sensor 200 from an object moving across the light sensing elements 206, each light sensing element 206 accumulates an electric charge proportional to the intensity of light incident on the light sensing element. The field of view is scanned across the focal plane of the sensor 200 (i.e., across each light sensing element 206) to generate a digital image. For example, as shown by the arrows 209 in FIG. 2, during a first frame 202, the charge accumulated by each light sensing element 206, as the object moves across the light sensing elements 206, is shifted to an adjacent light sensing element 206 (e.g., from left to right) until a signal corresponding to the total charge accumulated during the first frame 202 by the light sensing elements 206 is read out at the end (e.g., at the right side) of the array of light sensing elements 206 by the image processor 216. Similarly, as shown by the arrows 211 in FIG. 2, during a second frame 204, the charge accumulated by each light sensing element 206, as the object moves across the light sensing elements 206, is shifted to an adjacent light sensing element 206 (e.g., from left to right) until a signal corresponding to the total charge accumulated during the second frame 204 by the light sensing elements 206 is read out at the end (e.g., at the right side) of the array of light sensing elements 206 by the image processor 216.

During the first frame 202, the transfer of accumulated charge by each light sensing element 206 is controlled by the clock 212 operating at a first phase. As the object moves across a light sensing element 206 during the first frame 202 and the light sensing element 206 accumulates charge proportional to the intensity of light incident on the light sensing element 206 from the object, the clock 212 controls the light sensing element 206 to transfer accumulated charge at the first phase. For example, in one embodiment, the clock 212, operating at the first phase, controls the light sensing element 206 to transfer accumulated charge when the object is at a central point 208 in the field of view of the light sensing element 206. However, in other embodiments, the first phase of the clock 212 may be configured differently to control each light sensing element 206 during the first frame 202 to transfer accumulated charge when the object is at any other desired point in the field of view of the light sensing element 206.

During the second frame 204, the transfer of accumulated charge by each light sensing element 206 is controlled by the clock 212 operating at a second phase. As the object moves across a light sensing element 206 during the second frame 204 and the light sensing element 206 accumulates charge proportional to the intensity of light incident on the light sensing element 206 from the object, the clock 212 controls the light sensing element 206 to transfer accumulated charge at the second phase. For example, in one embodiment, the clock 212, operating at the second phase, controls the light sensing element 206 to transfer accumulated charge when the object is at an edge location 210 in the field of view of the light sensing element 206. However, in other embodiments, the second phase of the clock 212 may be configured differently to control each light sensing element 206 during the second frame 204 to transfer accumulated charge when the object is at any other desired point in the field of view of the light sensing element 206.

Utilizing knowledge of the first phase and the second phase of the clock 212, the image processor 216 combines the image data generated during each frame 202, 204 to generate a digital image of the field of view. By electronically introducing phase shift between the image data generated during the two frames 202, 204, the resolution of the resulting digital image is improved without requiring the physical movement and/or the physical separation of portions of the sensor 200.

As described above with regard to FIG. 2, image data is gathered from an array of light sensing elements in relation to two different phases over two frames; however, in other embodiments, image date may be gathered from an array of light sensing elements in relation to more than two different phases over more than two frames. Also as described above with regard to FIG. 2, a single clock is utilized to operate the light sensing elements at two different phases; however, in other embodiments, the sensor 200 may include more than one clock to operate the light sensing elements at different phases. As also described above, in certain embodiments, the first phase and the second phase are separated by an offset of 90 degrees; however, in other embodiments, the offset between the first phase and the second phase may be configured differently.

Figure 3:
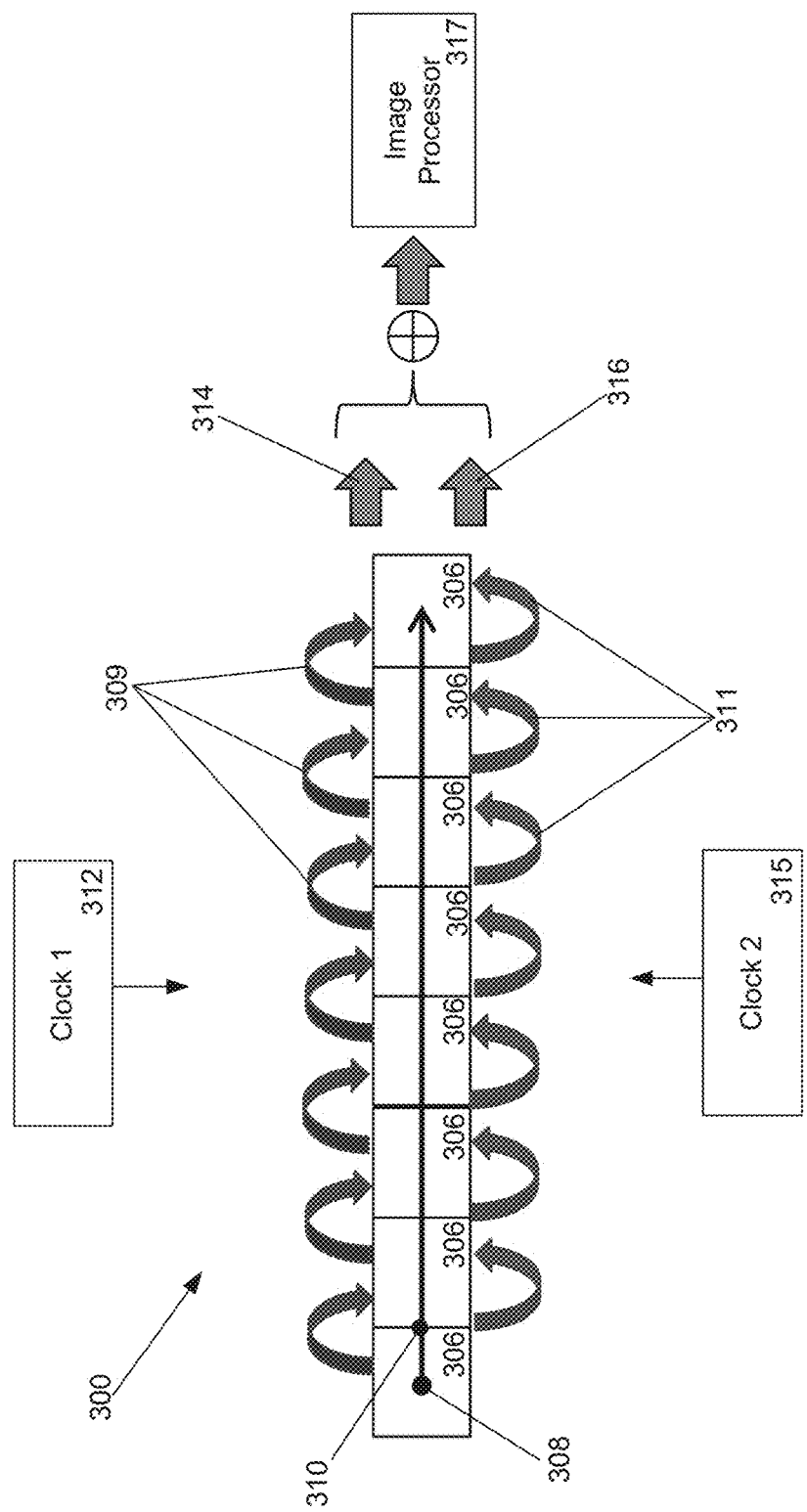
FIG. 3 is a block diagram illustrating another embodiment of a TDI image sensor according to aspects of the invention.

FIG. 3 is a block diagram illustrating another embodiment of a TDI image sensor 300 that may be used to capture images of a desired field of view. The sensor 300 includes an array of light sensing elements 306, a first memory bank 314, and a second memory bank 316.

In one embodiment, the light sensing elements 306 are digital pixels. Each digital pixel 306 contains a front-end analog circuit that integrates photo-current, generated in response to light incident on the digital pixel, as a charge on an internal capacitive element. When voltage across the internal capacitive element exceeds a reference value, the capacitor is reset and a digital counter is incremented. The digital counter counts the number of times the integration capacitor is reset and at a desired time, the value of the digital counter, representing the intensity of light incident on the digital pixel, is read out as a digital light intensity signal. For example, according to one embodiment, the sensor 300 may include digital pixels as described in U.S. patent application Ser. No. 13/866,066 entitled "REPARTI- TIONED DIGITAL PIXEL", filed on Apr. 19, 2013, which is herein incorporated by reference in its entirety.

As light is incident on the sensor 300 from an object moving across the digital pixels 306, each digital pixel 306 accumulates electric charge and generates a digital light intensity signal corresponding to the accumulated charge. The field of view is scanned across the focal plane of the sensor 300 (i.e., across each digital pixel 306) to generate a digital image. According to one embodiment, the field of view is scanned across the focal plane of the sensor simultaneously with respect to two different phases.

For example, in one embodiment, each digital pixel 306 is simultaneously controlled by a first clock 312 operating at a first phase and a second clock 315 operating at a second phase. The first clock 312 controls each digital pixel 306 to transfer accumulated signal value (i.e., in the form of a digital light intensity signal corresponding to the accumulated charge) to an adjacent digital pixel 306 at the first phase. As shown by the arrows 309 in FIG. 3, the digital light intensity signal generated by each digital pixel 306, as the object moves across the digital pixel 306, is shifted to an adjacent digital pixel 306 (e.g., from left to right) until the final digital light intensity signal read out at the end (e.g., at the right side) of the array of digital pixels 306 corresponds to the total charge accumulated in reference to the first phase. The final digital light intensity signal corresponding to the total charge accumulated in reference to the first phase is stored in the first memory bank.

In one embodiment, the first clock 312, operating at the first phase, controls the digital pixel 306 to transfer accumulated signal value (i.e., a digital light intensity signal corresponding to the accumulated charge) when the object is at a central point 308 in the field of view of the digital pixel 306. However, in other embodiments, the first phase of the first clock 312 may be configured differently to control each light sensing element 306 to transfer accumulated charge when the object is at any other desired point in the field of view of the light sensing element 306.

The second clock 315 controls each digital pixel 306 to transfer accumulated signal value (i.e., in the form of a digital light intensity signal corresponding to the accumulated charge) to an adjacent digital pixel 306 at the second phase. As shown by the arrows 311 in FIG. 3, the digital light intensity signal generated by each digital pixel 306 is shifted to an adjacent digital pixel 306 (e.g., from left to right) until the final digital light intensity signal read out at the end (e.g., at the right side) of the array of digital pixels 306 corresponds to the total charge accumulated in reference to the second phase. The final digital light intensity signal corresponding to the total charge accumulated in reference to the second phase is stored in the second memory bank.

In one embodiment, the second clock 315, operating at the second phase, controls the digital pixel 306 to transfer accumulated signal value (i.e., a digital light intensity signal corresponding to the accumulated charge) when the object is at an edge location 310 in the field of view of the digital pixel 306. However, in other embodiments, the second phase of the second clock 315 may be configured differently to control each light sensing element 306 to transfer accumulated charge when the object is at any other desired point in the field of view of the light sensing element 306.

Utilizing knowledge of the first phase and the second phase, the image processor 317 combines the final digital light intensity signals from the first memory bank 314 and the second memory bank 316 to generate a digital image of the field of view. By electronically introducing phase shift between the digital image data, the resolution of the resulting digital image may be improved without requiring the physical movement and/or the physical separation of portions of the sensor 200. In addition, by utilizing digital pixels and simultaneously operating the digital pixels 306 at different phases, the length of time required to gather the multi-phase image data from the sensor 300 may be reduced.

As described above with regard to FIG. 3, the sensor 300 includes two clocks 312, 315 and two parallel memory banks 314, 316 to process light intensity information from digital pixels corresponding to two different phases in parallel; however, in other embodiments, the sensor 300 may include more than two clocks and more than two parallel memory banks and may be configured to process light intensity information of digital pixels corresponding to more than two different phases in parallel. As also described above, in certain embodiments, the first phase and the second phase are separated by an offset of 90 degrees; however, in other embodiments, the offset between the first phase and the second phase may be configured differently.

As discussed above, the image sensor includes a single row of light sensing elements; however, in other embodiments, the image sensor may include any number of rows of light sensing elements. As also discussed above, in certain embodiments, the focal plane of the image sensor is scanned from left to right; however, in other embodiments, the focal plane of the image sensor may be scanned from right to left.

As discussed above, a system and method for improving the sampling resolution of a TDI image sensor by electronically introducing phase shift between sets of image data is provided. By varying the TDI clock phasing between electronically separated banks of light sensing elements, or varying the TDI clock phasing between different frames of an image sensor, or operating a TDI image sensor simultaneously in different, phase shifted, parallel paths, the resolution of a digital image generated by combining the resulting phase shifted image data can be improved, without requiring the potentially complex moving parts of traditional TDI image sensors.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A Time Delay and Integration (TDI) image sensor comprising:
   an array of light sensing elements arranged in a row, each light sensing element configured to accumulate charge proportional to an intensity of light incident on the light sensing element from a field of view, the array of light sensing elements including a light sensing element at an end of the row of light sensing elements;
   at least one clock coupled to the array of light sensing elements, the at least one clock configured to operate the array of light sensing elements to sequentially transfer the accumulated charge of each light sensing element in the row to an adjacent light sensing element at a first phase to produce a first total accumulated charge at the light sensing element at the end of the row, and to sequentially transfer the accumulated charge of each light sensing element in the row to an adjacent light sensing element at a second phase to produce a second total accumulated charge at the light sensing element at the end of the row, the first phase being different than the second phase;
a first memory bank coupled to the light sensing element at the end of the row of light sensing elements and configured to store a first total accumulated value corresponding to the first total accumulated charge;
a second memory bank coupled to the light sensing element at the end of the row of light sensing elements and configured to store a second total accumulated value corresponding the second total accumulated charge; and
an image processor coupled to the array of light sensing elements and configured to read out a first signal corresponding to the first total accumulated value from the first memory bank, to read out a second signal corresponding to the second total accumulated value from the second memory bank, and to combine the first signal and the second signal to generate an image,
wherein the image processor is further configured to read out the first signal and the second signal in parallel from the first memory bank and the second memory bank.

2. The TDI image sensor of claim 1, wherein the image processor is further configured to read out the first signal from the first memory bank during a first frame and to read out the second signal from the second memory bank during a second frame.

3. The TDI image sensor of claim 1, wherein the array of light sensing elements includes at least one digital pixel.

4. The TDI image sensor of claim 1, wherein the at least one clock includes a first clock operating at the first phase and a second clock operating at the second phase.

5. The TDI image sensor of claim 4, wherein the array of light sensing elements is operated by the first clock to transfer the accumulated charge to an adjacent light sensing element at the first phase, and
wherein the array of light sensing elements is operated by the second clock to transfer the accumulated charge to an adjacent light sensing element at the second phase.

6. The TDI image sensor of claim 1, wherein the first phase of the at least one clock corresponds to a central location in the field of view of each light sensing element.

7. The TDI image sensor of claim 6, wherein the second phase of the at least one clock corresponds to an edge location of the field of view of each light sensing element.

8. A method for operating a TDI image sensor comprising an array of light sensing elements arranged in a row, the method comprising acts of:
accumulating, in each light sensing element in the row, charge proportional to an intensity of light incident on the light sensing element from a field of view;
transferring, by each light sensing element in the row, the accumulated charge to an adjacent light sensing element at a first phase;
transferring, by each light sensing element in the row, the accumulated charge to an adjacent light sensing element at a second phase, the first phase being different than the second phase;
generating, at the light sensing element at an end of the row, a first total accumulated charge corresponding to a total charge accumulated in the array of light sensing elements at the first phase;
storing a first total accumulated value corresponding to the first total accumulated charge in a first memory bank coupled to the end of the row of light sensing elements;
generating, at the light sensing element at the end of the row, a second total accumulated charge corresponding to a total charge accumulated in the array of light sensing elements at the second phase;
storing a second total accumulated value corresponding to the second total accumulated charge in a second memory bank coupled to the end of the row of light sensing elements;
reading out a first signal corresponding to the first total accumulated value from the first memory bank;
reading out a second signal corresponding to the second total accumulated value from the second memory bank;
reading out the first signal and the second signal in parallel from the first memory bank and the second memory bank; and
combining the first signal with the second signal to generate an image.

9. The method of claim 8, wherein generating the first signal includes generating the first signal at a light sensing element at the end of the row of light sensing elements, and
wherein generating the second signal includes generating the second signal at the light sensing element at the end of the row of light sensing elements.

10. The method of claim 9, wherein generating the first signal includes generating the first signal at the light sensing element at the end of the row of light sensing elements during a first frame, and
wherein generating the second signal includes generating the second signal at the light sensing element at the end of the row of light sensing elements during a second frame.

11. The method of claim 9, wherein the acts of generating the first signal and generating the second signal are performed in parallel.

12. The method of claim 8, wherein transferring, by each light sensing element in the row, the accumulated charge to an adjacent light sensing element at the first phase includes transferring, by each light sensing element in the row, accumulated charge corresponding to a central location in the field of view of each light sensing element.

13. The method of claim 12, wherein transferring, by each light sensing element in the row, the accumulated charge to an adjacent light sensing element at the second phase includes transferring, by each light sensing element in the row, accumulated charge corresponding to an edge location in the field of view of each light sensing element.

14. A Time Delay and Integration (TDI) image sensor comprising:
a plurality of light sensing elements arranged in a row, each configured to accumulate charge proportional to an intensity of light incident on the light sensing element from a field of view;
a first memory bank coupled to the plurality of light sensing elements at an end of the row of light sensing elements;
a second memory bank coupled to the plurality of light sensing elements at the end of the row of light sensing elements; and
means for improving the sampling resolution of the TDI image sensor by electronically introducing phase shift between a first set of image data generated by the plurality of light sensing elements in the row at a first phase and a second set of image data generated by the plurality of light sensing elements in the row at a second phase, for reading out the first set of image data of the row from the first memory bank, for reading out the second set of image data of the row from the second memory bank, for reading out the first set of image data and the second set of image data in parallel from the first memory bank and the second memory bank, and for generating an image of the field of view based on the two sets of phase shifted image data,
wherein the first phase is different than the second phase.

* * * * *